(No Model.) 2 Sheets—Sheet 1.

T. J. KIELEY.
PRESSURE REGULATOR AND CUT-OFF.

No. 360,890. Patented Apr. 12, 1887.

(No Model.) 2 Sheets—Sheet 2.

T. J. KIELEY.
PRESSURE REGULATOR AND CUT-OFF.

No. 360,890. Patented Apr. 12, 1887.

UNITED STATES PATENT OFFICE.

TIMOTHY J. KIELEY, OF NEW YORK, N. Y.

PRESSURE REGULATOR AND CUT-OFF.

SPECIFICATION forming part of Letters Patent No. 360,890, dated April 12, 1887.

Application filed December 22, 1886. Serial No. 222,294. (No model.)

*To all whom it may concern:*

Be it known that I, TIMOTHY J. KIELEY, of the city, county, and State of New York, have invented a new and useful Pressure Regulator and Cut-Off, of which the following is a full, true, and exact description, reference being had to the accompanying drawings.

My apparatus is intended to automatically regulate the pressure of gas in a building or place where it is to be burned, reducing the pressure from that of the inlet or main to that of the outlet or burning system.

My invention, as shown, is applied to that class of regulators known as "diaphragm-regulators."

The object of my invention is especially to so construct a regulator as that it will perform automatically the double function of regulating the gas and of shutting off, until manipulated by an operator, the gas from the main, whenever it shall have happened that the gas from the main has itself been cut off from some external cause.

My regulator is particularly adapted to regulating the supply of natural gas, though it is useful for all other gas regulation. Where natural gas is burned in open furnaces and for heating purposes, it happens that at times the pressure in the main ceases, when of course all the burning jets in the house or building will be extinguished; and then, again, when the gas-pressure returns on the mains, it would be ordinarily liable to escape into the house through the openings in the burners which might have been left open.

My apparatus will be readily understood from the accompanying drawings, of which—

Figure 1:
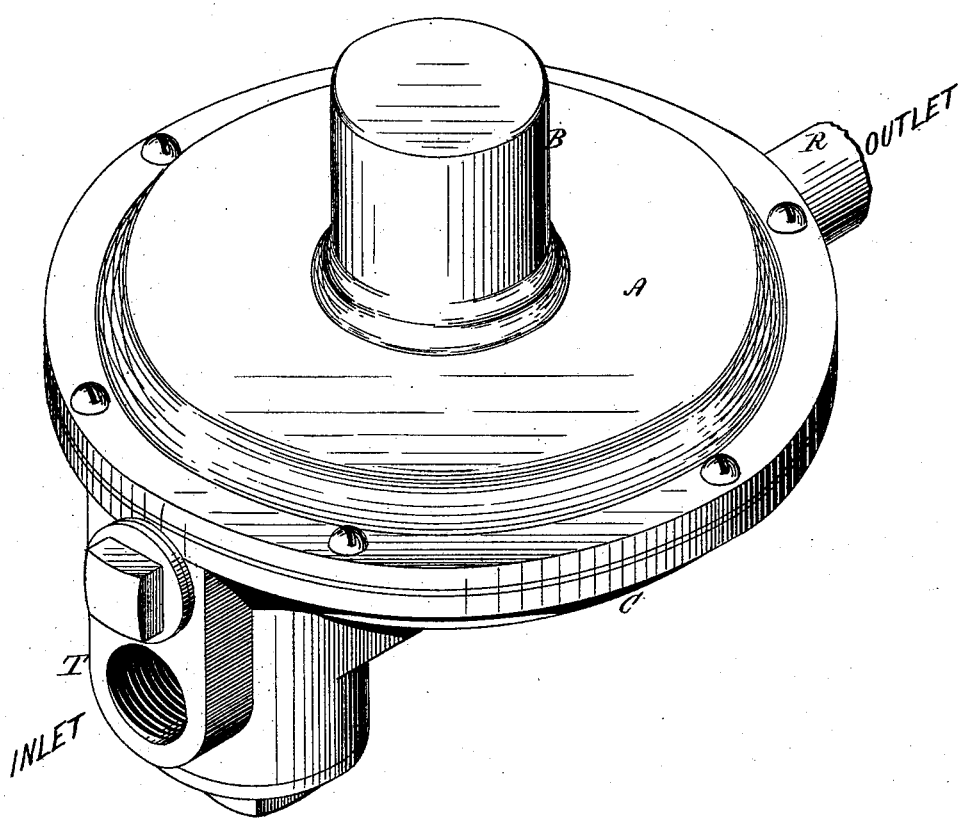
Figure 2:
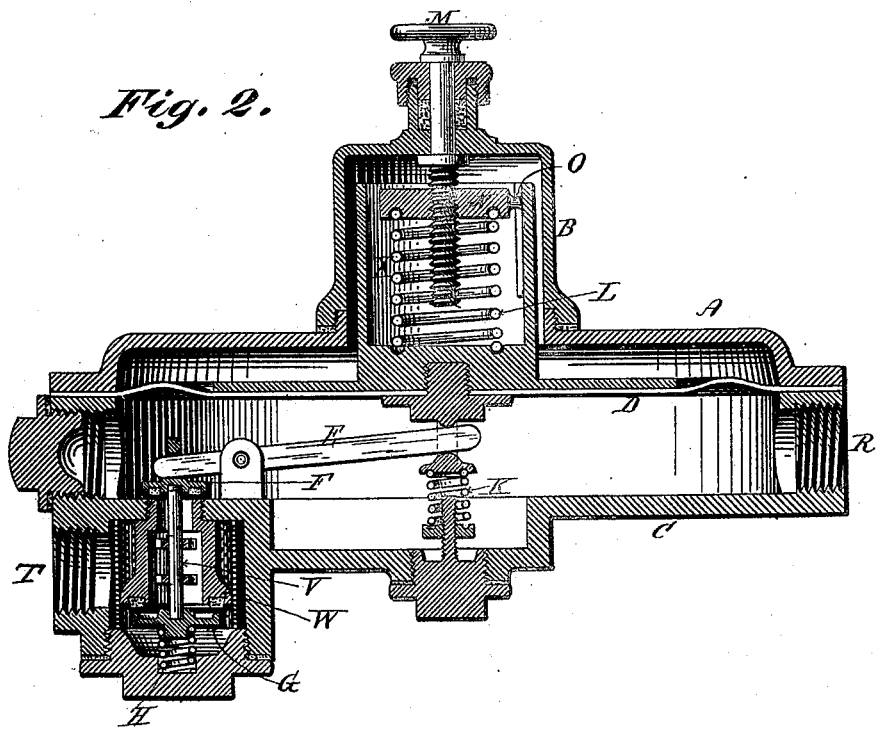
Figure 3:
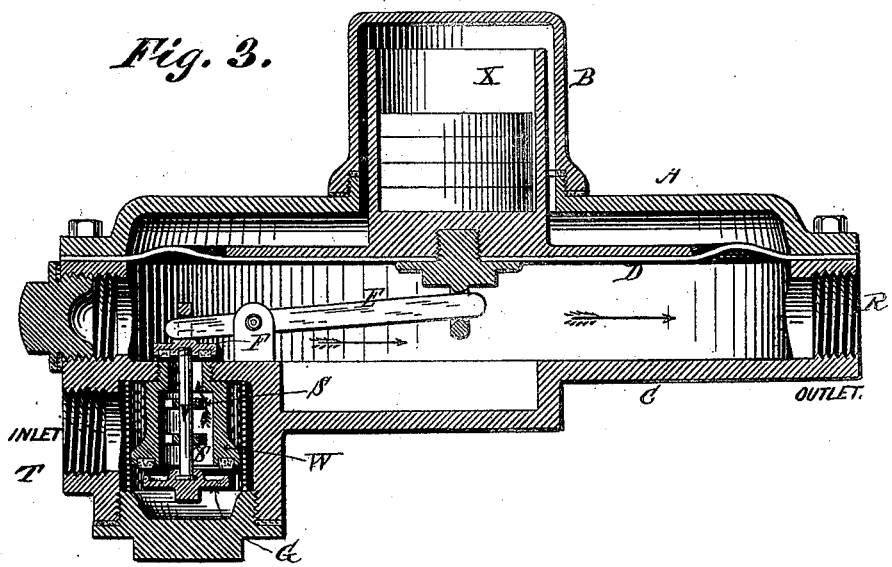

Figure 1 represents an external view; Fig. 2, a cross-section thereof; Fig. 3, a cross-section of a modification in which no springs are employed.

Similar letters refer to similar parts in all the drawings.

The general operation of my regulator is similar to that in all gas-regulators. It consists of a casing composed of the parts A and C, between which the diaphragm D is clamped. Upon the cover A is placed the dome B. The regulating-valve is shown at F, and may be of any suitable construction. This is operated by the pivoted lever E, generally controlled through the diaphragm by suitable connections exhibited. Attached to the valve-stem V, which slides through the spider-frame S S, is the cut-off valve G.

Fig. 3 shows the apparatus in the preferable form. It will be seen that the valve G seats upward, and the valve F downward, upon suitable valve-seats in the properly-supported valve-chamber W. Upon the diaphragm D is placed the cup-shaped receptacle X, within which, in Fig. 3, are placed the adjustable weights Y.

In the form shown in Fig. 2 the spring L is used in place of the weights Y. This spring is made adjustable by the spring-cap N, operated by screw M, which spring-cap may be prevented from withdrawing by the feather and groove O, or any other suitable adjusting contrivance may be employed. A small spring, K, may likewise be employed to counterbalance the spring L, in order to obtain accuracy of adjustment. I do not regard this as essential in Fig. 2. The spring H may likewise be employed, tending to raise the valve G. As I have before stated, however, I deem it more advisable to dispense with springs altogether and use the form shown in Fig. 3.

By reference to the drawings it will be observed that the openings of the regulating and cut-off valves F and G vary in diameter, that the area of the latter exceeds that of the former, and that consequently said latter valve, when the regulator is in use, does not interfere with the flow of gas by partly closing the opening so as to throttle the gas at this point.

The operation of my apparatus can now be understood. The gas enters by the inlet T and escapes by the outlet R. Whenever the pressure below the diaphragm is sufficient to cause the diaphragm to rise, thereby overcoming the weight or spring resistance, the valve F will close, or partly close, allowing only sufficient gas to pass into the chamber below the diaphragm to supply the draft therefrom, maintaining the requisite pressure. This is the ordinary operation of the apparatus. If, however, the inlet-pressure should entirely cease, then it is plain that, there being no pressure in the chamber below the diaphragm, the diaphragm would fall, thereby closing the stop-valve G, which closing would prevent the passage of gas by it, and therefore prevent thereafter the diaphragm D being raised by the pressure of the external gas unless the said diaphragm were raised. Under these circumstances, in order to put the apparatus in operation again, an attendant must go to it and unscrew the dome B, when, by raising the cup X, pressure will be once more admitted to the gas-regulator, which will thereafter continue to properly operate. This dome is screwed down by a gas-tight packing, as shown, so that if by any accident the diaphragm should break or leak gas could not escape to the house. The regulating-screw M should likewise be packed by a suitable stuffing-box.

This apparatus will be the means of preventing, at any rate in part, the dangerous explosions from gas, several of which have of late occurred.

It is obvious that my improvement of the double valve operated by the varying conditions of gas-pressure is applicable not only to a diaphragm-regulator, but also to any other form of regulator substantially equivalent thereto—such, for instance, as an inverted cup-regulator. For ordinary purposes I prefer, however, the form shown.

What I claim as my invention, and desire to secure by Letters Patent, is—

1. In a gas-regulator, the combination, with the gas-supply or service pipe, of a casing interposed in said pipe, a chamber within said casing in position to be traversed by the full volume of gas, a flexible diaphragm forming one side of said chamber, a regulating-valve controlling the pressure of gas upon said diaphragm, and a cut-off valve of greater area than the regulating-valve controlling the flow of gas to said chamber and controlled by said diaphragm, substantially as described.

2. The combination, with a casing interposed in a gas-supply or service pipe and a chamber within said casing in position to be traversed by the full volume of gas, of a flexible diaphragm forming one side of said chamber, a two-beat valve having opposite ends of unequal area controlling the passage of gas to said chamber, and connections, substantially as described, between said valve and said diaphragm, whereby the movements of said diaphragm control said valve, substantially as described.

3. A casing interposed in a fluid-supply or service pipe, a flexible diaphragm dividing said casing into separate chambers, one of which communicates through openings at its opposite sides directly with said service-pipe, a two-beat valve controlling the flow of fluid through one of said openings, a valve having opposite ends of unequal area, an operating-lever connected to said diaphragm and said valve at its opposite ends, respectively, and mechanism, substantially as described, to cause said diaphragm to oppose a variable resistance to the pressure of the fluid, as and for the purpose set forth.

4. The combination, in a gas-regulator, of the diaphragm D, adjustable spring L, spring K, valve F, operated by said diaphragm, and spring H, substantially as described.

5. The combination, with a regulator-casing interposed in a gas service-pipe, and a diaphragm dividing said casing into separate chambers, of a removable cap or dome closing an opening communicating with one of said chambers, openings formed through the opposite sides of the remaining chamber and communicating directly with the service-pipe, a two-beat valve having opposite ends of unequal area controlling communication through one of said openings, connections between said valve and diaphragm, and devices, substantially as described, within said removable cap or dome to impart variable pressure to said diaphragm, as and for the purpose set forth.

6. The combination, in a gas-regulator and cut-off, of the gas-chamber, a diaphragm, D, closing said chamber, lever E, valves F and G, stem V, connecting said valves, and spring H, to raise said valves, substantially as described.

7. The combination, in a gas-regulator, of a gas-chamber, a diaphragm, D, forming one side of said chamber, a two-beat valve having disks F and G, of unequal diameter, stem V, connecting said disks, and lever E, connecting said stem with said diaphragm, substantially as described.

In testimony whereof I have signed my name to this specification in the presence of two subscribing witnesses.

TIMOTHY J. KIELEY.

Witnesses:
 GEORGE T. CURTIS, Jr.,
 GEO. W. MIATT.